US009737054B2

(12) United States Patent
Nielsen et al.

(10) Patent No.: US 9,737,054 B2
(45) Date of Patent: Aug. 22, 2017

(54) PET CHEW TOY ASSEMBLY

(71) Applicant: Petstages, Inc., Northbrook, IL (US)

(72) Inventors: Kristian Nielsen, Northbrook, IL (US);
Jennifer Crotty, Lake Bluff, IL (US);
Mariann Straub, Winnetka, IL (US);
Steven V. Bisbikis, Northbrook, IL (US)

(73) Assignee: THE KYJEN COMPANY, LLC, Centennial, CO (US)

( * ) Notice: Subject to any disclaimer, the term of this patent is extended or adjusted under 35 U.S.C. 154(b) by 203 days.

(21) Appl. No.: 14/871,203

(22) Filed: Sep. 30, 2015

(65) Prior Publication Data

US 2016/0095297 A1 Apr. 7, 2016

Related U.S. Application Data

(60) Provisional application No. 62/058,869, filed on Oct. 2, 2014.

(51) Int. Cl.
*A01K 15/00* (2006.01)
*A01K 15/02* (2006.01)

(52) U.S. Cl.
CPC .................. *A01K 15/026* (2013.01)

(58) Field of Classification Search
CPC ...... A01K 15/00; A01K 15/025; A01L 15/026
USPC .......... 119/707–711; 426/94, 143, 279, 237, 426/641, 644, 646
See application file for complete search history.

(56) References Cited

U.S. PATENT DOCUMENTS

| | | | |
|---|---|---|---|
| 4,674,444 A | 6/1987 | Axelrod | |
| 5,339,771 A | 8/1994 | Axelrod | |
| 5,339,977 A * | 8/1994 | Schormair | B65D 21/022 |
| | | | 220/284 |
| 6,076,486 A | 6/2000 | Oliano | |
| 6,379,725 B1 * | 4/2002 | Wang | A01K 15/026 |
| | | | 426/104 |
| 6,427,634 B1 | 8/2002 | Mann | |
| 6,586,027 B2 | 7/2003 | Axelrod et al. | |
| 6,634,318 B1 | 10/2003 | Rucker | |
| 8,192,776 B2 | 6/2012 | Vardy et al. | |
| 8,512,045 B2 * | 8/2013 | Bittner | B32B 1/00 |
| | | | 428/34.1 |
| 8,584,620 B2 | 11/2013 | Rutherford et al. | |
| 2006/0102099 A1 | 5/2006 | Edwards | |
| 2013/0247836 A1 | 9/2013 | Axelrod et al. | |
| 2016/0081304 A1 * | 3/2016 | Nielsen | A01K 15/025 |
| | | | 514/772.3 |
| 2016/0113242 A1 * | 4/2016 | Lacasse | A01K 15/026 |
| | | | 426/661 |

* cited by examiner

*Primary Examiner* — Richard Price, Jr.

(57) ABSTRACT

A pet chew toy assembly including a body having a first component, wherein the first component comprises a thermoplastic, a bone meal, and an antler powder.

20 Claims, 6 Drawing Sheets

PET CHEW TOY ASSEMBLY

CROSS-REFERENCE TO RELATED APPLICATIONS

This application claims the benefit of U.S. Provisional Application Ser. No. 62/058,869, filed Oct. 2, 2014, which is hereby incorporated herein by reference in its entirety.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to pet chew toys and, more particularly, to pet chew toy assemblies that resemble animal antlers and comprise a thermoplastic, bone meal, and antler powder. Such chew toy assemblies provide a pet with a unique, safe, and healthy chewing experience compared to natural animal antlers and/or currently available synthetic chew toys.

2. Background Art

Pet chew toys have been known in the art for years and are the subject of a plurality of patents and publications, including: U.S. Pat. No. 8,584,620 entitled "Overmolded Pet Toy," U.S. Pat. No. 8,192,776 entitled "Chewable Animal Toy," U.S. Pat. No. 6,634,318 entitled "Closure for Pet Feeding Toy," U.S. Pat. No. 6,586,027 entitled "Health Chew Toy," U.S. Pat. No. 6,427,634 entitled "Pet Toy," U.S. Pat. No. 6,379,725 entitled "Protein-Based Chewable Pet Toy," U.S. Pat. No. 6,076,486 entitled "Animal Chew Toy and Holder," U.S. Pat. No. 5,339,771 entitled "Animal Chew Toy Containing Animal Meal," U.S. Pat. No. 4,674,444 entitled "Chewing Toy for Dogs and Preparation Thereof," United States Patent Application Publication Number 2013/0247836 entitled "Pet Chew Toy Product," and United States Patent Application Publication Number 2006/0102099 entitled "Polymeric Dog Bone,"—all of which are hereby incorporated herein by reference in their entirety including all references cited therein.

U.S. Pat. No. 8,584,620 appears to disclose a pet toy comprising, in one embodiment, a body have an outer surface, an interior and at least one opening in the outer surface extending into the interior, an overmold supported by the body, and a portion of the overmold extending substantially over the at least one opening and further comprising an inwardly deflectable passage to provide access to the interior therethrough. The interior, in one embodiment, may be provided with a plurality of baffles that create a spiral path.

U.S. Pat. No. 8,192,776 appears to disclose a chewable animal toy having an edible core and a tearable outer shell molded around the edible core such that a portion of the edible core protrudes from the outer shell. Further provided is a mold unit for making the chewable animal toy having a first mold half including a first mold cavity and a second mold half having a second mold cavity. The second mold half is engageable with the first mold half such that the first and second mold cavities cooperatively define an outer shell mold cavity. A first pocket is defined between the first and second mold halves that is adapted to receive a first protruding portion of the edible core. A first shut off defined within the first pocket is adapted to surround the first protruding portion of the edible core such that it is substantially isolated from the outer shell mold cavity.

U.S. Pat. No. 6,634,318 appears to disclose a closure for a hollow pet toy that holds edible materials containing a cut-out relief that extends above a desired shear plane. When fully inserted into the large opening of a pet toy the top of the cut-out relief lies above the shear plane, outside the toy. If the pet bites into the closure or wets it with saliva, it will break or disintegrate into sections which are too small or too large to lodge in the large opening of the toy. Thus when the pet bites or wets and breaks the closure, none of the pieces of the closure can lodge in the opening of the toy and prevent the pet from reaching and eating the contents. An alternative embodiment is provided with a cylindrical top which can be eaten by the pet, cannot lodge in the pet toy opening, and which can be printed or embossed with a logo.

U.S. Pat. No. 6,586,027 appears to disclose a vitamin and/or mineral and/or herbal enriched molded animal chew toy. The vitamins, minerals and/or herbal additives are incorporated into the molded chew toy under conditions that minimize thermal degradation of such additives. Suitable resins include starch, casein, denatured and partially hydrolyzed casein, thermoplastic polymers and mixtures thereof. In related embodiment, animal chews comprising primarily denatured and partially hydrolyzed collagen are disclosed, as well as such denatured and partially hydrolyzed collagen in mixture with vegetable matter, rawhide, animal meal, peanut bits/flour, casein, starch and mixtures thereof.

U.S. Pat. No. 6,427,634 appears to disclose a non-consumable pet toy that comprises a three-dimensional body formed of substantially solid resilient material with a trapper cavity that has first and second opposing walls that extend into the body. At least one end of the trapper cavity is open to an external surface of the body to permit insertion of an animal attractant into the trapper cavity. A bias cavity is formed in the body adjacent the trapper cavity and spaced from the first wall. A bias member is formed between the bias cavity and that much of the trapper cavity defined by at least the first wall. The bias member is operatively associated with the trapper cavity to bias the first wall against an attractant in the trapper cavity so that the attractant is retained between the first and second walls. In one form the trapper cavity includes large head-like portions at the ends of a shank-like portion. In another form, a second trapper cavity and bias cavity complement the first to receive an animal attractant in the second trapper cavity.

U.S. Pat. No. 6,379,725 appears to disclose protein-based, edible chewable pet toys, such as artificial dog bones, and methods of preparing such chewable pet toys. The chewable pet toys are made from protein-based thermoplastic composition containing plant and animal derived proteinic material and various additive and nutrient ingredients. Chewable pet toys within the scope of the present invention possess properties of conventional artificial dog bones made of synthetic polymer, such as good strength and hardness, but they are biodegradable and edible. In addition, the chewable pet toys contain vitamins, minerals, flavorings, oral hygiene additives and other ingredients to help keep teeth and bones strong and to promote the growth and health of the pet.

U.S. Pat. No. 6,076,486 appears to disclose an apparatus which may be used to secure and position animal chew toys. An animal chew toy is secured by various means in an elevated position so as to alleviate the need for manipulation by the animal, thus increasing access and use by the animal, and extending the life of the chew toy.

U.S. Pat. No. 5,339,771 appears to disclose a chew toy for pets which is made from a molded synthetic thermoplastic having animal meal dispersed in the plastic.

U.S. Pat. No. 4,674,444 appears to disclose a chewing toy for dogs and a process for its preparation, wherein a nylon piece, preferably having the shape of a bone, has an impregnated layer of caramelized sugar adjacent but below its surface to impart a dark brown color and a flavor to the near-surface region of the toy. The chewing toy is prepared by placing a piece of water-absorbent nylon into an aqueous solution of caramelized sugar at a temperature of about 250° C. and an applied pressure of about 30 psi for a period of at least about 8 hours, so that the aqueous solution penetrates into the surface of the piece to impart the dark brown color to the near-surface region of the piece. The coloring and sweet taste provide an initial appeal to the animal, increasing its initial acceptance of the toy. The heat treatment also anneals the as-formed nylon to impart greater strength, reduce brittleness, and improve its resistance to shattering. The toy may also be treated with a second appeal-enhancing agent, such as a ham scent and flavor, to provide a further appeal to the animal.

U.S. Patent Application Publication Number 2013/0247836 appears to disclose a pet toy product comprising at least one edible treat and a body member in the form of a ring surrounding the edible treat, with the body member having opposing sides and a body member aperture. The edible treat is receivable into the body member aperture from either side of the body member, and connected to the body member within the body member aperture by a releaseable mechanical connection formed between the edible treat and the body member.

U.S. Patent Application Publication Number 2006/0102099 appears to disclose a polymeric dog bone comprising an elongated central body portion having an end portion. At least one end member extends from the end portion of the central body portion. In at least one embodiment, the end member has a first surface, a second surface, a plurality of first-shaped features located on the first surface, and a plurality of second-shaped features having a different shape than the first-shaped features located on the second surface.

While the above-identified patents and publications do appear to disclose a plurality of pet chew toys, their configurations remain non-desirous and/or problematic inasmuch as, among other things, none of the above-identified pet chew toys: (1) resemble an animal antler; (2) comprise a thermoplastic, bone meal, and antler powder; and (3) provide a pet with a unique, safe, and healthy chewing experience compared to natural animal antlers and/or currently available synthetic chew toys.

These and other objects of the present invention will become apparent in light of the present specification, claims, and drawings.

SUMMARY OF THE INVENTION

The present invention is directed to a pet chew toy assembly comprising, consisting essentially of, and/or consisting of: a body having a first component, wherein the first component comprises a thermoplastic, a bone meal, and an antler powder.

In a preferred embodiment of the present invention, the thermoplastic of the first component comprises at least one of a poly(methyl methacrylate), an acrylonitrile butadiene styrene, a polyimide (e.g., nylon), a polylactic acid, a polybenzimidazole, a polycarbonate, a polyether sulfone, a poly ether-ether ketone, a polyetherimide, a polyethylene, a polyphenylene oxide, a polyphenylene sulfide, a polypropylene, a polystyrene, a polyvinyl chloride, a polytetrafluoroethylene and combinations thereof.

In another preferred embodiment of the present invention, the bone meal comprises one or more of crude protein, crude fiber, calcium, phosphorus, and ash. Preferably, the bone meal comprises approximately 40 percent to approximately 60 percent by weight crude protein, approximately 2 percent to approximately 10 percent by weight crude fiber, approximately 5 percent to approximately 12 percent by weight calcium, approximately 2 percent to approximately 5 percent by weight phosphorus, and approximately 15 percent to approximately 30 percent by weight ash.

In yet another preferred embodiment of the present invention, the antler powder comprises at least one of deer antler powder, moose antler powder, elk antler powder, and combinations thereof.

In one aspect of the present invention, the thermoplastic preferably comprises a polyamide, the bone meal preferably comprises crude protein and crude fiber, and the antler powder preferably comprises deer antler powder.

In a preferred embodiment of the present invention, the thermoplastic is present in a concentration ranging from approximately 50 percent by weight to approximately 98 percent by weight of the first component, the bone meal is present in a concentration ranging from approximately 0.5 percent by weight to approximately 25 percent by weight of the first component, and the antler powder is present in a concentration ranging from approximately 0.5 percent by weight to approximately 25 percent by weight of the first component.

In another preferred embodiment of the present invention, the ratio (by weight) of the thermoplastic to the bone meal ranges from approximately 8:1 to approximately 2:1, and the ratio (by weight) of the thermoplastic to the antler powder ranges from approximately 8:1 to approximately 2:1.

In yet another preferred embodiment of the present invention, the first component further comprises a binding agent. Preferred examples of binding agents include, for example, one or more of sucrose, lactose, starch, cellulose, cellulosic fiber, modified cellulose, microcrystalline cellulose, cellulose ether, hydroxypropyl cellulose, sugar alcohol, gelatin, collagen, and combinations thereof.

In a preferred embodiment of the present invention, the pet chew toy assembly further comprises a second component comprising one or more of a styrenic block copolymer, a thermoplastic polyolefin elastomer, a thermoplastic vulcanisate, a thermoplastic polyurethane elastomer, a melt processable rubber, a thermoplastic polyester elastomer, a thermoplastic amide elastomer, and combinations thereof. In this embodiment, the thermoplastic polyolefin elastomer preferably comprises a density ranging from approximately 0.75 g/cm$^3$ to approximately 0.95 g/cm$^3$, and more preferably comprises a density ranging from approximately 0.84 g/cm$^3$ to approximately 0.89 g/cm$^3$. Furthermore, in this embodiment, the thermoplastic polyolefin elastomer preferably comprises a Tg ranging from approximately −35 degrees centigrade to approximately −75 degrees centigrade.

In another preferred embodiment of the present invention, the pet chew toy assembly further comprises at least one adjunct agent selected from the group comprising an antimicrobial agent, an oral hygiene additive, a medicament, an herbal additive, a mineral, a vitamin, a scent, a colorant, a flavorant, rawhide, and combinations thereof.

The present invention is also directed to a pet chew toy assembly comprising, consisting essentially of, and/or consisting of: (a) a first component, wherein the first component comprises a thermoplastic, a bone meal, an antler powder; and (b) wherein the ratio (by weight) of the thermoplastic to the bone meal ranges from approximately 8:1 to approximately 2:1, and the ratio (by weight) of the bone meal to the antler powder ranges from approximately 25:1 to approximately 1:1.

The present invention is further directed to a pet chew toy assembly comprising, consisting essentially of, and/or consisting of: a unitary body, wherein the unitary body consists of a thermoplastic, a bone meal, and an antler powder.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 1:
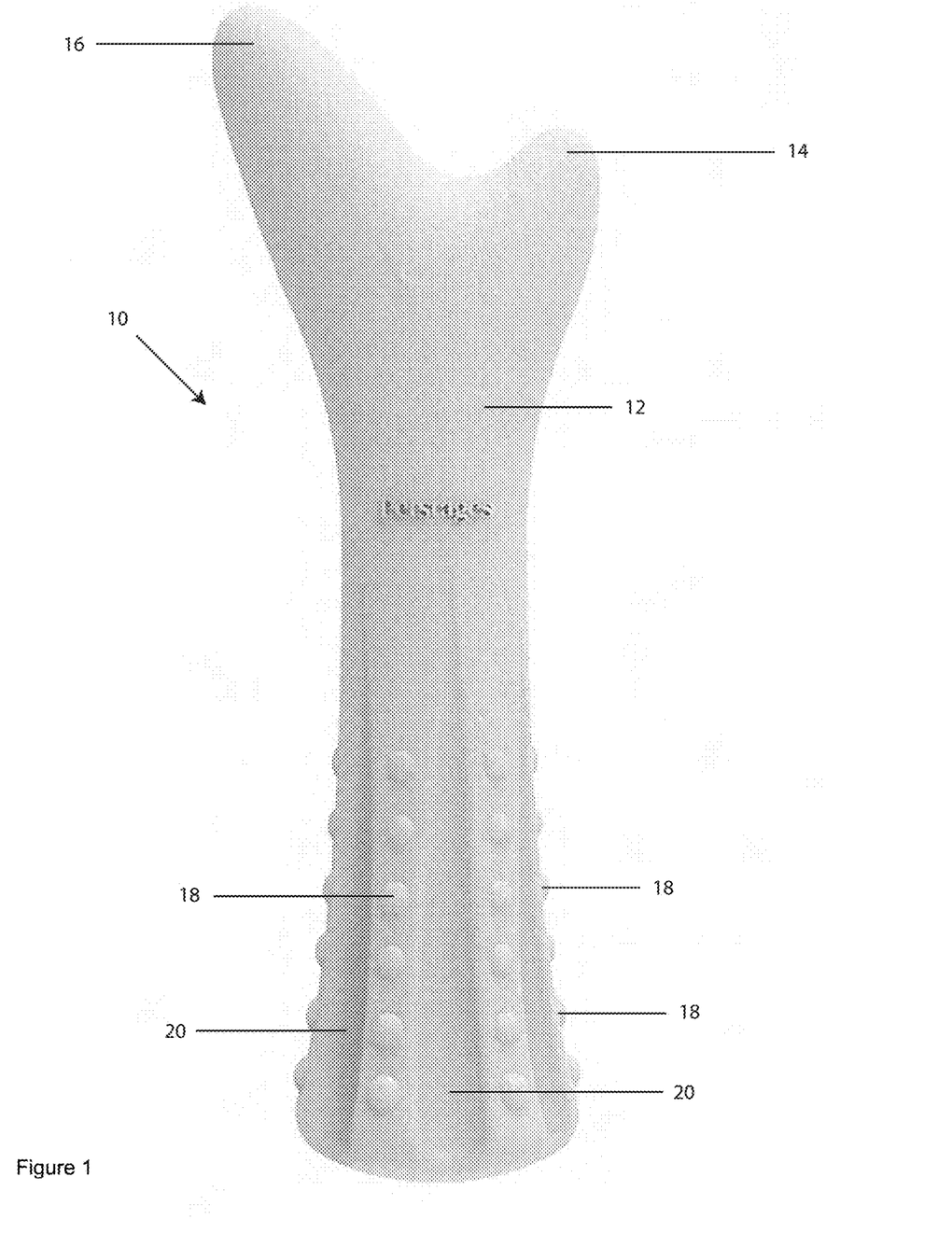
FIG. 1 of the drawings is an isometric view of a pet chew toy assembly manufactured in accordance with the present invention.
Figure 2:
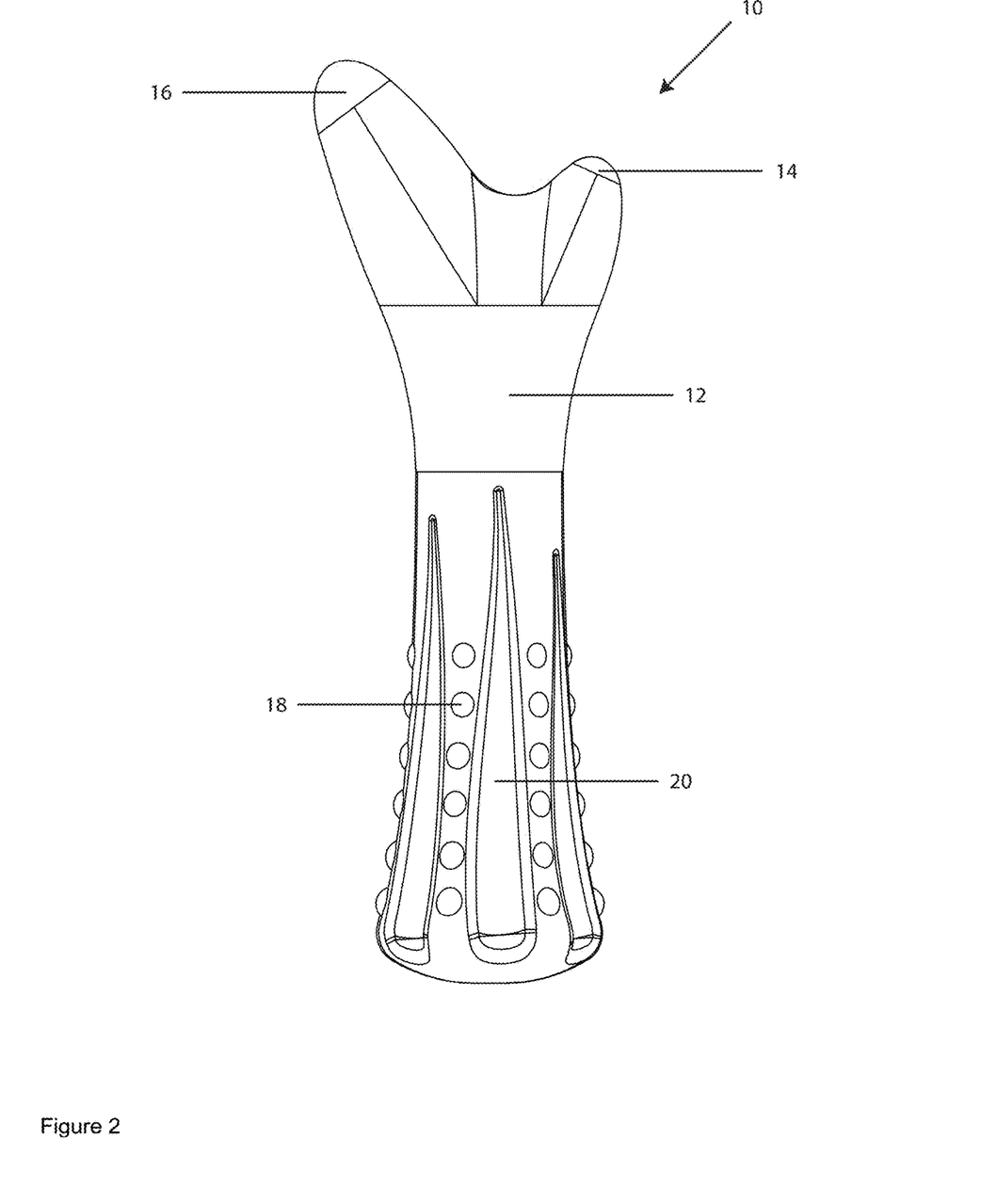
FIG. 2 of the drawings is also an isometric view of a pet chew toy assembly manufactured in accordance with the present invention.
Figure 3:
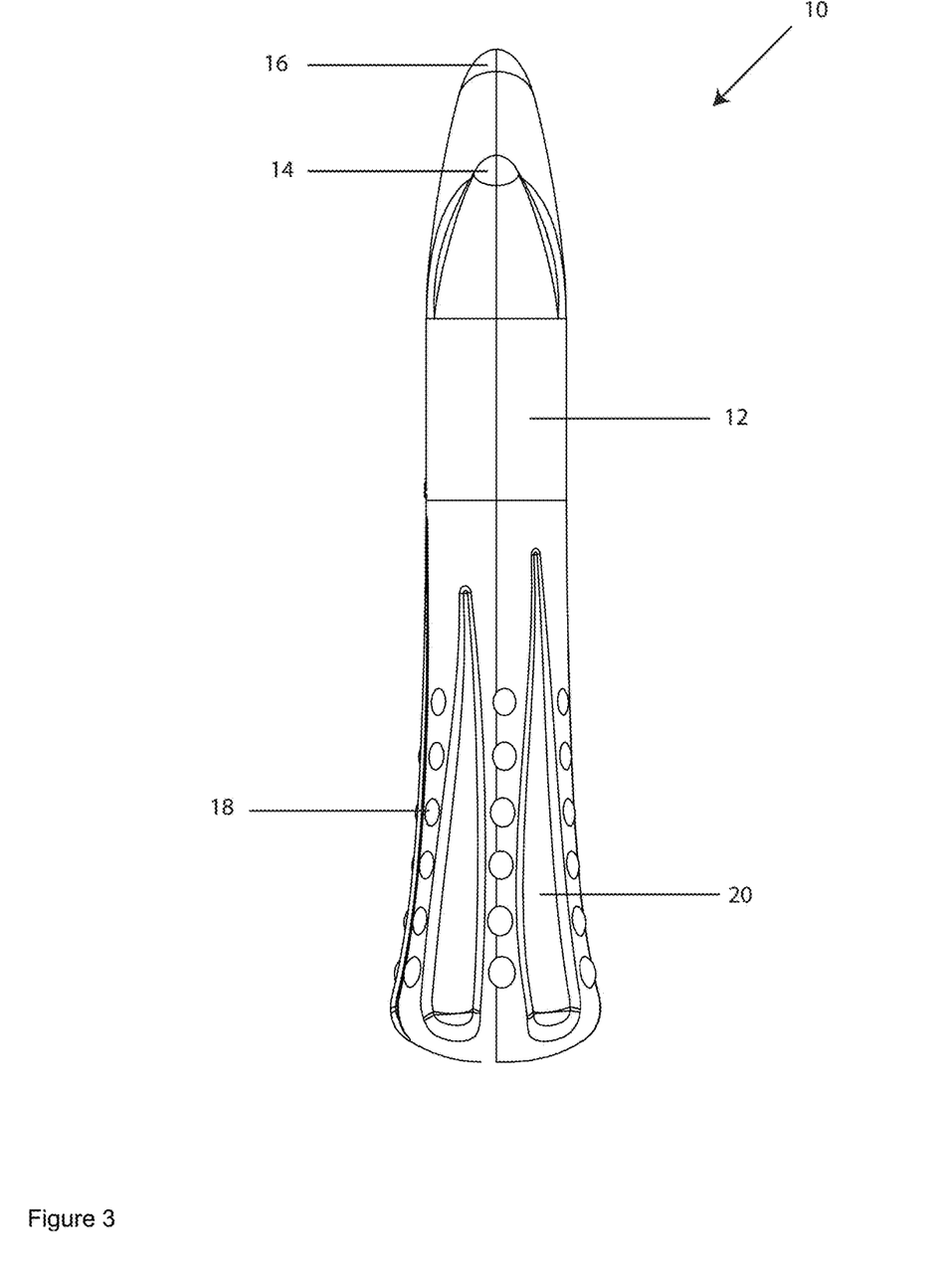
FIG. 3 of the drawings is a first end view of a pet chew toy assembly manufactured in accordance with the present invention.
Figure 4:
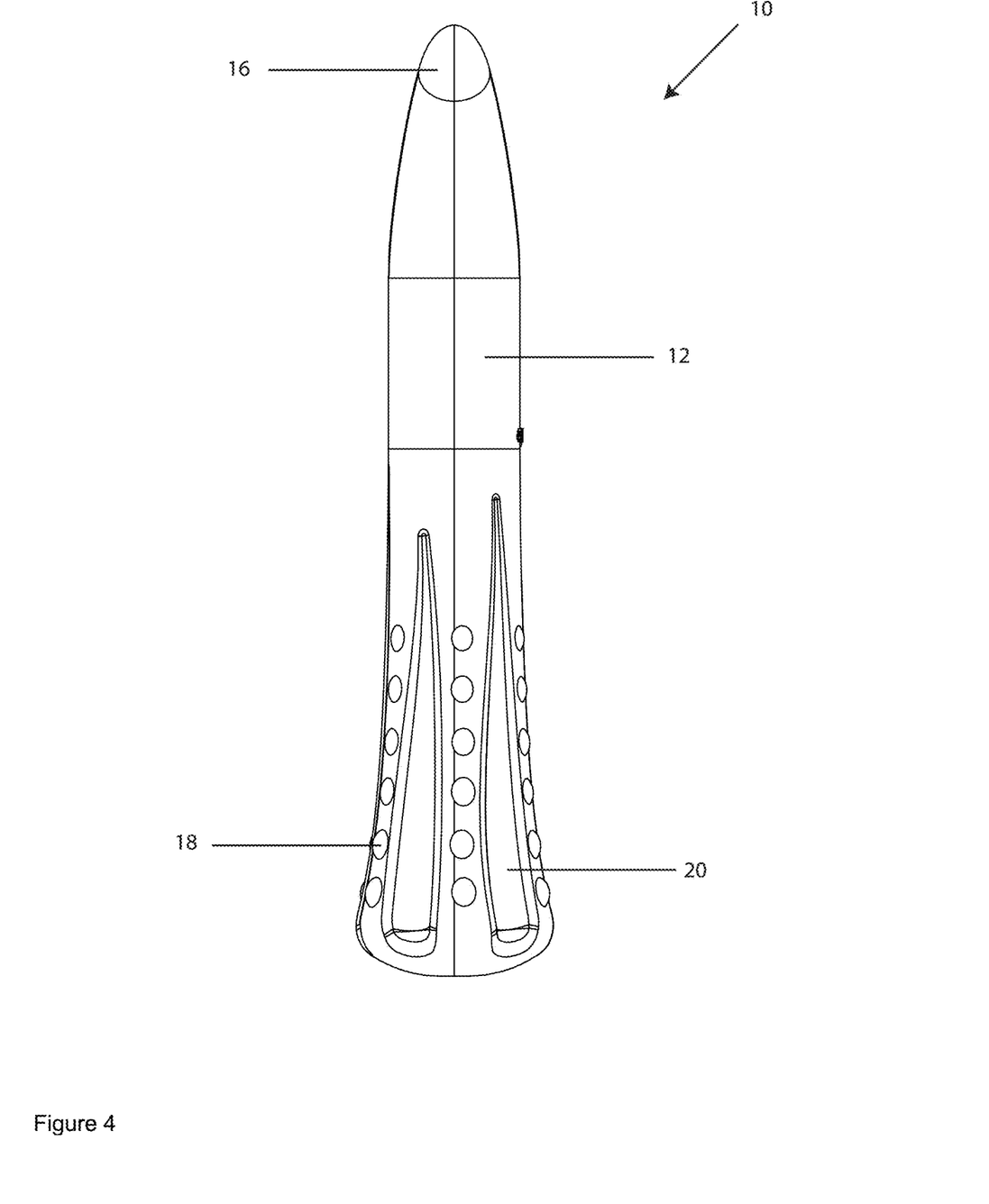
FIG. 4 of the drawings is a second end view of a pet chew toy assembly manufactured in accordance with the present invention.
Figure 5:
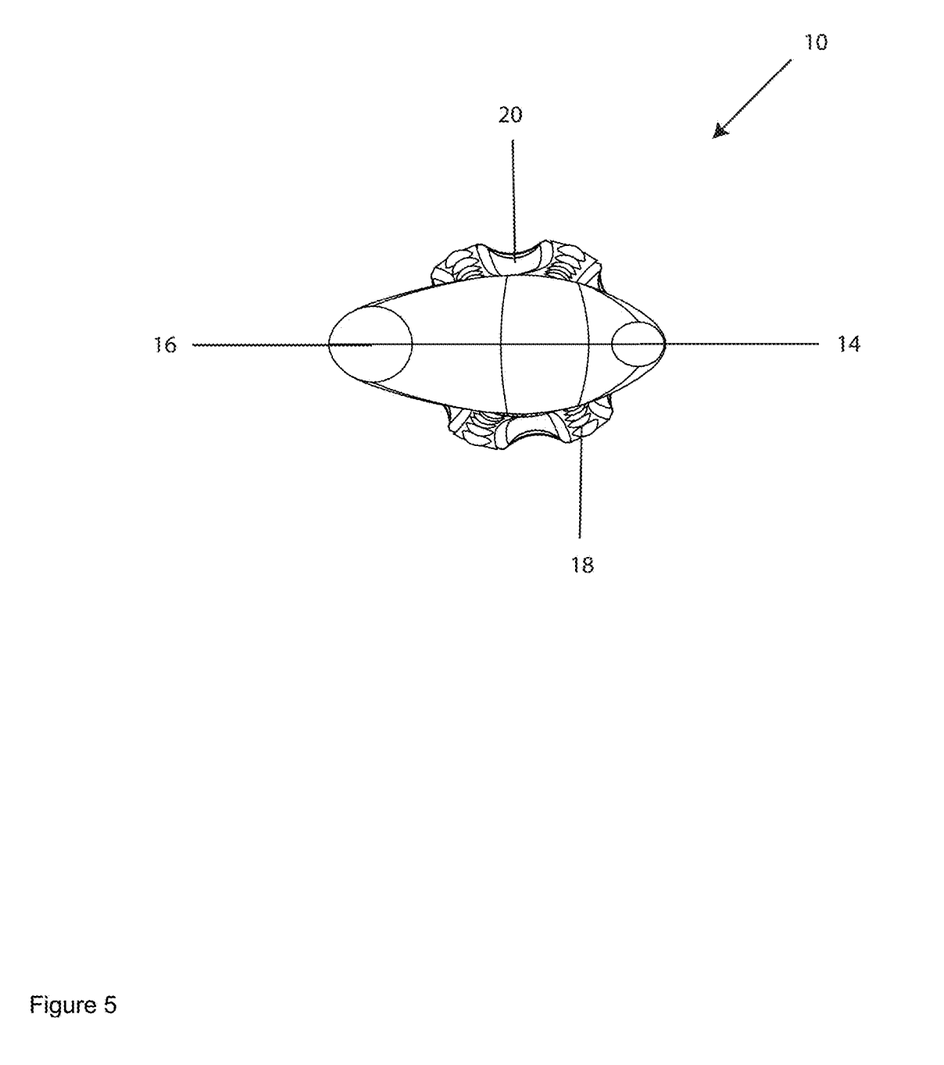
FIG. 5 of the drawings is a top plan view of a second pet chew toy assembly manufactured in accordance with the present invention.
Figure 6:
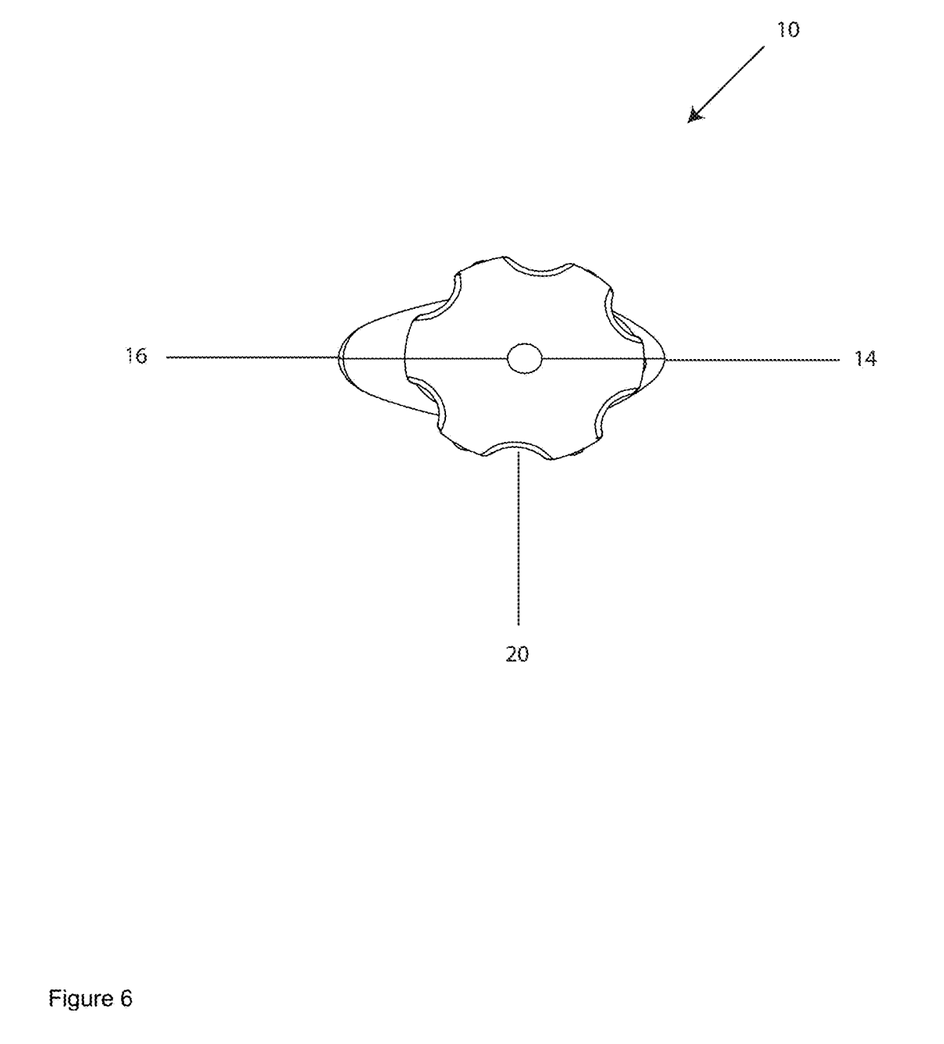
FIG. 6 of the drawings is a bottom plan view of a second pet chew toy assembly manufactured in accordance with the present invention.

It will be understood that like or analogous elements and/or components, referred to herein, may be identified throughout the drawings with like reference characters. It will be further understood that FIGS. 1-6 are merely schematic representations of a pet chew toy assembly. As such, some of the components have been distorted from their actual scale for pictorial clarity.

In accordance with the present invention, the pet chew toy assemblies disclosed herein provide a pet with a unique, safe, and healthy chewing experience relative to natural animal antlers and/or currently available synthetic chew toys. The pet chew toy assemblies generally include a body having a first component that imitates the structural aspect of a natural animal antler, and an optional second component that is more flexible, malleable, and/or resilient. Notably, while the body is preferably formed at least partially in the shape of an animal antler, the body can be formed into any one of a number of predetermined shapes and optionally forms a cavity within interior peripheral geometries.

Referring now to the drawings and to FIGS. 1-6 in particular, pet chew toy assembly 10 is shown which generally comprises a body 12 that preferably comprises a first component fabricated from a thermoplastic, a bone meal, and an antler powder. The body 12 preferably includes a first tip 14, a second tip 16, a plurality of protrusions 18, and a plurality of grooves or slots 20. As will be discussed in greater detail below, the first tip 14, the second tip 16, the protrusions 18 and the grooves/slots 20 can be fabricated from the same material as the body (e.g., the first component), or alternatively, one or more of these parts can be fabricated from a second component.

In one embodiment, the thermoplastic of the first component preferably comprises one or more of a poly(methyl methacrylate), an acrylonitrile butadiene styrene, a polyamide (e.g., nylon), a polylactic acid, a polybenzimidazole, a polycarbonate, a polyether sulfone, a poly ether-ether ketone, a polyetherimide, a polyethylene, a polyphenylene oxide, a polyphenylene sulfide, a polypropylene, a polystyrene, a polyvinyl chloride, and/or a polytetrafluoroethylene.

Preferably, the bone meal of the first component comprises crude protein, crude fiber, calcium, phosphorus, and ash. More preferably, the bone meal comprises approximately 40 percent to approximately 60 percent by weight crude protein, approximately 2 percent to approximately 10 percent by weight crude fiber, approximately 5 percent to approximately 12 percent by weight calcium, approximately 2 percent to approximately 5 percent by weight phosphorus, and approximately 15 percent to approximately 30 percent by weight ash.

For purposes of the present disclosure the antler powder preferably comprises at least one of deer antler powder, moose antler powder, elk antler powder, and combinations thereof.

In one embodiment of the present invention, the thermoplastic of the first component (e.g., nylon) is present in a concentration ranging from approximately 50 percent by weight to approximately 98 percent by weight of the first component, the bone meal is present in a concentration ranging from approximately 0.5 percent by weight to approximately 25 percent by weight of the first component, and the antler powder is present in a concentration ranging from approximately 0.5 percent by weight to approximately 25 percent by weight of the first component.

In another aspect of the present invention, the ratio (by weight) of the thermoplastic to the bone meal ranges from approximately 8:1 to approximately 2:1 (and more preferably approximately 5:1 to approximately 3:1), and the ratio (by weight) of the thermoplastic to the antler powder ranges from approximately 8:1 to approximately 2:1 (and more preferably approximately 5:1 to approximately 3:1).

In one embodiment of the present invention, one or more of the first tip 14, the second tip 16, the protrusions 18 and/or the grooves/slots 20 can be fabricated from a second component. The second component preferably comprises at least one of a styrenic block copolymer, a thermoplastic polyolefin elastomer, a thermoplastic vulcanisate, a thermoplastic polyurethane elastomer, a melt processable rubber, a thermoplastic polyester elastomer, and/or a thermoplastic amide elastomer. Preferably, the second component (e.g., thermoplastic polyolefin elastomer) comprises a density ranging from approximately 0.75 g/cm$^3$ to approximately 0.95 g/cm$^3$, and more preferably comprises a density ranging from approximately 0.84 g/cm$^3$ to approximately 0.89 g/cm$^3$.

Furthermore, the second component (e.g., thermoplastic polyolefin elastomer) preferably comprises a Tg ranging from approximately −35 degrees centigrade to approximately −75 degrees centigrade, and more preferably comprises a Tg ranging from approximately −40 degrees centigrade to approximately −60 degrees centigrade.

Preferred second component thermoplastic polyolefin elastomers include, for example, ENGAGE 7270, ENGAGE 7277, ENR 7380, ENGAGE HM 7387, ENGAGE 7447, ENGAGE 7467, ENGAGE 8003, ENGAGE 8100, ENGAGE 8107, ENGAGE 8130, ENGAGE 8137, ENGAGE 8150, ENGAGE 8157, ENGAGE 8180, ENR 8187, ENGAGE XLT 8677, ENGAGE 8200, ENGAGE 8207, ENGAGE 8400, ENGAGE 8407, ENGAGE 8842, ENGAGE HM 7487, DOW VLDPE 1085, ENGAGE HM 7280, DOW VLDPE 1095, ENGAGE HM 7289, NORDEL IP 3720P, NORDEL IP 3745, and/or AMPLIFY GR 216.

In accordance with the present invention, the first component may also include a binding agent, such as one or more of sucrose, lactose, starch, cellulose, cellulosic fiber, modified cellulose, microcrystalline cellulose, cellulose ether, hydroxypropyl cellulose, sugar alcohol, gelatin, and/or collagen.

In further accordance with the present invention, first component and optional second component may also optionally include one or more adjunct agents such as, a solvent (e.g., polar and/or non-polar solvent), an anti-microbial agent, an oral hygiene additive, a medicament, an herbal additive, a mineral, a vitamin, a scent, a colorant, a flavorant, and rawhide.

In accordance with the present invention, anti-microbial agents comprise chemical compositions that at least substantially inhibit microbial growth and/or kill bacteria, fungi and/or other microorganisms. A plurality of inorganic and/or organic chemical compositions which display anti-microbial activity are suitable for use with the present invention. Non-limiting examples of suitable organic substances that possess anti-microbial activity are carboxylic acids, alcohols and/or aldehydes, most of which appear to act by protein precipitation and/or by disruption of microbial cell membrane.

In one embodiment of the present invention, the anti-microbial activity of suitable inorganic substances is generally related to the ions, toxic to other microorganisms, into which they dissociate. The anti-microbial activity of various metal ions, for example, is often attributed to their affinity for protein material and the insolubility of the metal proteinate formed. Metal-containing salts are thus preferred among the inorganic substances that act as anti-microbial agents.

Metal inorganic salts, including simple salts of metal cations and inorganic anions like silver nitrate, are often soluble and dissociable and, hence, offer ready availability of potentially toxic ions.

Metal salts or complexes of organic moieties such as organic acids, on the other hand, are often less soluble and, therefore, are less dissociable than the soluble metal inorganic salts. Metal organic salts or complexes generally have a greater stability with respect to extraneous organic matter, and anions present in the environment of the living cell than metal inorganic salts, but have less toxic potential by virtue of their greater stability.

Silver ion is an example of a preferred metal ion which possesses anti-microbial activity. To the best of Applicant's knowledge silver ions react with a variety of anions as well as with chemical moieties of proteins. Precipitation of proteins, causing disruption of the microbial cell membrane and complexation with DNA, is likely the basis of the anti-microbial activity. Silver ions in high concentration will form insoluble silver chloride and thereby deplete chloride ions in vivo.

Anti-bacterials are antiseptics that have the proven ability to act against bacteria. Non-limiting examples of anti-bacterials suitable for use in accordance with the present invention include alcohols such as ethanol (20-99$^+$%), 1-propanol (20-99$^+$%) and 2-propanol/isopropanol (20-99$^+$%) or mixtures of these alcohols. They are commonly referred to as "surgical alcohol". Used to disinfect the skin before injections are given, often along with iodine (tincture of iodine) or some cationic surfactants (benzalkonium chloride 0.05-0.5%, chlorhexidine 0.2-4.0% or octenidine dihydrochloride 0.1-2.0%). Other common anti-bacterials include quaternary ammonium compounds known as Quats or QAC's, include the chemicals benzalkonium chloride (BAC), cetyl trimethylammonium bromide (CTMB), cetylpyridinium chloride (Cetrim, CPC) and benzethonium chloride (BZT). Benzalkonium chloride is used in some pre-operative skin disinfectants (conc. 0.05-0.5%) and antiseptic towels. The anti-microbial activity of Quats is inactivated by anionic surfactants, such as soaps. Related disinfectants include chlorhexidine and octenidine.

It will be understood that first component and/or second component may be single or double sidedly dip or spray coated with the anti-microbial, anti-bacterial, and/or anti-viral agent, or alternatively one or both components may be impregnated with one or more of the aforementioned agents.

It will be further understood that the pet chew toys disclosed herein can be fabricated using conventional techniques, such as single and/or multi-part injection molding, inlay molding, over molding, extruding, and three-dimensional printing—just to name a few. In one embodiment, the product is prepared by combining a thermoplastic, real bone meal, and antler powder to form pellets that can then be melted and extruded into various shapes and/or sizes. By combining the mixture into pellets first, it can be better assure that the mixed formula ingredients are well blended throughout the toy. However, one alternative approach includes mixing ingredients at the time of molding parts, not as pellets. Furthermore, the novel formula is intentionally not as hard as natural animal antler and will crumble when chewed by pet, so it is safer for a pet's teeth.

The foregoing description merely explains and illustrates the invention and the invention is not limited thereto except insofar as the appended claims are so limited, as those skilled in the art who have the disclosure before them will be able to make modifications without departing the scope of the invention.

What is claimed and desired to be secured by Letters Patent of the United States is:

1. A pet chew toy assembly, comprising:
   a body having a first component, wherein the first component comprises a thermoplastic, a bone meal, and an antler powder.

2. The pet chew toy assembly according to claim 1, wherein the thermoplastic of the first component comprises at least one of a poly(methyl methacrylate), an acrylonitrile butadiene styrene, a polyamide, a polylactic acid, a polybenzimidazole, a polycarbonate, a polyether sulfone, a poly ether-ether ketone, a polyetherimide, a polyethylene, a polyphenylene oxide, a polyphenylene sulfide, a polypropylene, a polystyrene, a polyvinyl chloride, a polytetrafluoroethylene and combinations thereof.

3. The pet chew toy assembly according to claim 1, wherein the thermoplastic of the first component comprises a polyamide.

4. The pet chew toy assembly according to claim 1, wherein the thermoplastic of the first component comprises nylon.

5. The pet chew toy assembly according to claim 1, further comprising a binding agent.

6. The pet chew toy assembly according to claim 5, wherein the binding agent of the first component comprises at least one of sucrose, lactose, starch, cellulose, cellulosic fiber, modified cellulose, microcrystalline cellulose, cellulose ether, hydroxypropyl cellulose, sugar alcohol, gelatin, collagen, and combinations thereof.

7. The pet chew toy assembly according to claim 1, wherein the bone meal comprises crude protein, crude fiber, calcium, phosphorus, and ash.

8. The pet chew toy assembly according to claim 7, wherein the bone meal comprises approximately 40 percent to approximately 60 percent by weight crude protein, approximately 2 percent to approximately 10 percent by weight crude fiber, approximately 5 percent to approximately 12 percent by weight calcium, approximately 2 percent to approximately 5 percent by weight phosphorus, and approximately 15 percent to approximately 30 percent by weight ash.

9. The pet chew toy assembly according to claim 1, wherein the antler powder comprises at least one of deer antler powder, moose antler powder, elk antler powder, and combinations thereof.

10. The pet chew toy assembly according to claim 1, wherein the thermoplastic comprises a polyamide, the bone meal comprises crude protein and crude fiber, and the antler powder comprises deer antler powder.

11. The pet chew toy assembly according to claim 1, wherein the thermoplastic is present in a concentration ranging from approximately 50 percent by weight to approximately 98 percent by weight of the first component, the bone meal is present in a concentration ranging from approximately 0.5 percent by weight to approximately 25 percent by weight of the first component, and the antler powder is present in a concentration ranging from approximately 0.5 percent by weight to approximately 25 percent by weight of the first component.

12. The pet chew toy assembly according to claim 1, wherein the ratio (by weight) of the thermoplastic to the bone meal ranges from approximately 8:1 to approximately 2:1, and the ratio (by weight) of the thermoplastic to the antler powder ranges from approximately 8:1 to approximately 2:1.

13. The pet chew toy assembly according to claim 1, further comprising a second component that comprises one or more of a styrenic block copolymer, a thermoplastic polyolefin elastomer, a thermoplastic vulcanisate, a thermoplastic polyurethane elastomer, a melt processable rubber, a thermoplastic polyester elastomer, a thermoplastic amide elastomer, and combinations thereof.

14. The pet chew toy assembly according to claim 1, wherein the second component comprises a thermoplastic polyolefin elastomer.

15. The pet chew toy assembly according to claim 14, wherein the thermoplastic polyolefin elastomer comprises a density ranging from approximately 0.75 $g/cm^3$ to approximately 0.95 $g/cm^3$.

16. The pet chew toy assembly according to claim 14, wherein the thermoplastic polyolefin elastomer comprises a density ranging from approximately 0.84 $g/cm^3$ to approximately 0.89 $g/cm^3$.

17. The pet chew toy assembly according to claim 14, wherein the thermoplastic polyolefin elastomer comprises a Tg ranging from approximately −35 degrees centigrade to approximately −75 degrees centigrade.

18. The pet chew toy assembly according to claim 1, further comprising at least one adjunct agent selected from the group comprising an anti-microbial agent, an oral hygiene additive, a medicament, an herbal additive, a mineral, a vitamin, a scent, a colorant, a flavorant, rawhide, and combinations thereof.

19. A pet chew toy assembly, comprising:
a first component, wherein the first component comprises a thermoplastic, a bone meal, an antler powder; and
wherein the ratio (by weight) of the thermoplastic to the bone meal ranges from approximately 8:1 to approximately 2:1, and the ratio (by weight) of the bone meal to the antler powder ranges from approximately 25:1 to approximately 1:1.

20. A pet chew toy assembly, consisting of:
a unitary body, wherein the unitary body consists of a thermoplastic, a bone meal, and an antler powder.

* * * * *